United States Patent
Nachbar et al.

(10) Patent No.: US 10,036,417 B2
(45) Date of Patent: Jul. 31, 2018

(54) LINK ROD FOR A MOTOR VEHICLE

(71) Applicant: ZF Friedrichshafen AG, Friedrichshafen (DE)

(72) Inventors: Frank Nachbar, Osnabrück (DE); Volker Grube, Diepholz (DE)

(73) Assignee: ZF Friedrichshafen, Friedrichshafen (DE)

( * ) Notice: Subject to any disclaimer, the term of this patent is extended or adjusted under 35 U.S.C. 154(b) by 0 days.

(21) Appl. No.: 15/511,025

(22) PCT Filed: Sep. 14, 2015

(86) PCT No.: PCT/EP2015/070968
§ 371 (c)(1),
(2) Date: Mar. 14, 2017

(87) PCT Pub. No.: WO2016/058760
PCT Pub. Date: Apr. 21, 2016

(65) Prior Publication Data
US 2017/0276170 A1 Sep. 28, 2017

(30) Foreign Application Priority Data
Oct. 14, 2014 (DE) .................. 10 2014 220 796

(51) Int. Cl.
*F16C 11/06* (2006.01)
*B60G 7/00* (2006.01)

(52) U.S. Cl.
CPC .......... *F16C 11/0695* (2013.01); *B60G 7/001* (2013.01); *B60G 7/005* (2013.01); *B60G 2206/11* (2013.01)

(58) Field of Classification Search
CPC .... B60G 7/005; B60G 2206/11; B60G 7/001; F16C 11/0695
See application file for complete search history.

(56) References Cited

U.S. PATENT DOCUMENTS 5,607,177 A * 3/1997 Kato ................... B60G 3/06
188/377
6,557,318 B2 * 5/2003 Graber ................ B21D 53/84
180/89.14
(Continued)

FOREIGN PATENT DOCUMENTS

DE 10 2010 041 791 A1 4/2012
DE 10 2011 084 164 A1 4/2013
(Continued)

OTHER PUBLICATIONS

International Search Report Corresponding to PCT/EP2015/070968 dated Jan. 4, 2016.
(Continued)

*Primary Examiner* — Nicole T Verley
(74) *Attorney, Agent, or Firm* — Davis & Bujold PLLC; Michael J. Bujold

(57) ABSTRACT

A link rod for a motor vehicle, with a connecting rod (4) designed with an open profile that extends in an axial direction (x), which comprises a back (8) and two opposed sidepieces (9, 10) which are connected to one another by the back (8), extending away from the back so as to enclose an angle (a) of less than 180° between them. Two joints (2, 3) are connected to one another by the connecting rod (4), each joint comprises a joint housing (5) and an inner joint component (6) that is fitted and able to move in the housing and extends outwardly therefrom. The connecting rod (4) is embedded, at its respective axial ends, in one of the joint housings (5), and the sidepieces (9, 10) enclose an angle (α) of at least 90° between them.

13 Claims, 2 Drawing Sheets

(56) References Cited

U.S. PATENT DOCUMENTS

| | | | | |
|---|---|---|---|---|
| 7,938,417 B2 * | 5/2011 | Ersoy | ............... | B60G 7/001 |
| | | | | 280/124.134 |
| 8,267,415 B2 * | 9/2012 | Jeong | ............... | B60G 7/001 |
| | | | | 280/124.133 |
| 8,651,504 B2 * | 2/2014 | Gerhards | ............ | B60G 7/001 |
| | | | | 280/124.134 |
| 8,757,649 B2 * | 6/2014 | Erdogan | ............. | B60G 7/001 |
| | | | | 280/124.128 |
| 9,487,058 B2 * | 11/2016 | Santini | ............. | B29D 24/002 |
| 9,561,699 B2 * | 2/2017 | Haselhorst | ......... | B60G 7/001 |
| 9,884,531 B2 * | 2/2018 | Watanabe | .......... | B60G 7/001 |
| 2005/0258613 A1 * | 11/2005 | Kleckner | .......... | B60G 7/001 |
| | | | | 280/124.107 |
| 2009/0001681 A1 * | 1/2009 | Morales Arnaez | .... | B60G 7/001 |
| | | | | 280/124.134 |
| 2011/0079979 A1 * | 4/2011 | Koumura | .......... | B60G 7/001 |
| | | | | 280/124.1 |
| 2012/0038126 A1 * | 2/2012 | Monchiero | .......... | B60G 7/001 |
| | | | | 280/124.131 |
| 2017/0144499 A1 * | 5/2017 | Kimura | ............... | B60G 7/001 |
| 2017/0210188 A1 * | 7/2017 | Meyer | ................ | B60G 7/005 |

FOREIGN PATENT DOCUMENTS

| | | | | |
|---|---|---|---|---|
| EP | 1217233 A1 * | 6/2002 | ......... | B60G 21/0551 |
| EP | 1 772 297 A1 | 4/2007 | | |
| EP | 1 953 012 A2 | 8/2008 | | |
| EP | 2987665 A1 * | 2/2016 | ............ | B21D 53/88 |
| FR | 2 874 537 A1 | 3/2006 | | |
| JP | 2000108632 A | 4/2000 | | |
| KR | 20110063164 A * | 6/2011 | ....... | B29C 45/14778 |
| WO | WO-2012141039 A1 * | 10/2012 | .......... | B60G 21/055 |

OTHER PUBLICATIONS

Written Opinion Corresponding to PCT/EP2015/070968 dated Jan. 4, 2016.

* cited by examiner

LINK ROD FOR A MOTOR VEHICLE

This application is a National Stage completion of PCT/EP2015/070968 filed Sep. 14, 2015, which claims priority from German patent application serial no. 10 2014 220 796.7 filed Oct. 14, 2014.

FIELD OF THE INVENTION

The invention concerns a link rod for a motor vehicle, with a connecting rod which is designed with an open profile that extends in an axial direction and comprises a back and two sidepieces opposite one another which are connected to one another by the back, extending away therefrom and enclosing an angle of less that 180° between them, and two joints connected to one another by the connecting rod, each comprising a joint housing and an inner joint component which is fitted and able to move in the housing and extends outward therefrom, such that the connecting rod is embedded with each of its axial ends in a respective joint housing.

BACKGROUND OF THE INVENTION

DE 10 2010 041 791 A1 discloses a vehicle component with a joint holder that comprises a connection area in which a recess is provided, a connecting element extending longitudinally with an axial end area that engages in the recess of the connection area and extends in the direction of its longitudinal axis away from it, which has a substantially constant cross-section over its entire length and is secured in the connection area against any displacement in the direction of its longitudinal axis, such that, moreover, the connecting element is secured in an interlocked manner against any twisting about its longitudinal axis. The connecting element is made of metal, while in contrast the joint holder is made of plastic. Furthermore, in the joint holder an inner joint component is fitted and able to move. In addition another axial end area of the connecting element is connected to another joint holder in which another inner joint component is fitted and able to move, wherein the joint holders are designed in the same way and are connected to the connecting element in the same manner, the connecting element being in the form of a U-section.

An example of a use for such a vehicle component is a control arm or a pendulum support in the wheel suspension of a motor vehicle. Since the connecting element is made of a material different from that of the joint holders, such a vehicle component is also called a hybrid control arm or hybrid pendulum support.

Hybrid control arms and hybrid pendulum supports as a rule consist of plastic-metal connectors, which are made using a plastic injection-molding process. The joint housings consist of plastic heads connected to one another by a connecting element which is not made of plastic but, for example, metal. The known basic geometries of the connecting element are, among others, a round rod and a U-section. To produce the plastic heads, the connecting element is placed in a plastic injection-molding die and plastic is injection-molded around it. During this the connecting element has to be sealed relative to the injection-molding cavity of the injection-molding die. As a rule the injection-molding die has two mutually perpendicular main mold-extraction directions. If the connecting element is not rotationally symmetrical but for example a U-section, problems can arise in connection with the sealing in the injection-molding die. Particularly if the rotational angle of the plastic heads relative to one another differs from 0° or 180°, the sealing of the connecting element in the injection molding die is problematic, so that it may be necessary to insert an oblique slider that can move obliquely relative to the main mold-extraction directions. However, the provision of an oblique slider is complicated and entails relatively high costs. To circumvent this problem it is conceivable to use a round rod as the connecting element. But compared with a hollow section, a round rod is relatively heavy and this is undesirable.

SUMMARY OF THE INVENTION

Starting from there, the purpose of the present invention is to develop further a link rod of the type mentioned at the beginning, in such manner that any angular positions of the joints relative to one another are possible without having to insert an oblique slider during the production of the link rod.

That objective is achieved by a link rod as described below. Preferred further developments of the link rod are also indicated in the description given below.

The link rod for a motor vehicle comprises a connecting rod in the form of an open section that extends in an axial direction, which has a back and two sidepieces opposite one another which are connected to one another by the back and extend away from the latter particularly on one side, enclosing between them an angle of less than 180°, as well as two joints connected to one another by the connecting rod, each comprising a joint housing and an inner joint component which is fitted and able to move in the housing and extends outward therefrom, such that the connecting rod is embedded with each of its axial ends in a respective joint housing and such that, particularly in the cross-section of the connecting rod, the sidepieces enclose between them an angle of at least 90°.

Since the sidepieces enclose an angle of at least 90° between them, the connecting rod can be placed in an injection-molding die rotated by any amount relative to the axial direction without an undercut being formed relative to the two mutually perpendicular main mold-extraction directions. Thus, the connecting rod can always be sealed in the main mold-extraction directions relative to the injection-molding cavity. Moreover, the connecting rod can always be extracted from the mold in the main mold-extraction directions. Accordingly, regardless of the angular position of the joints relative to one another the use of an oblique slider for sealing and/or extracting the connecting rod is no longer necessary.

The back extends in particular in the axial direction. Preferably, the back is flat or substantially flat. The sidepieces each extend, in particular, transversely to the axial direction opposite one another. In particular, the sidepieces are opposite one another a distance apart. Preferably the distance between the sidepieces, especially transversely to the axial direction, increases with increasing distance from the back. Preferably, at their ends directed toward the back the sidepieces merge into the back, particularly in a material-homogeneous way. The ends of the sidepieces facing away from the back are in particular free ends of the sidepieces. Preferably the sidepieces are arranged a distance apart, particularly transversely to the axial direction. Advantageously, at their ends directed toward the back the sidepieces are a distance apart from one another, especially transversely to the axial direction. Preferably, in the area of the back and in particular transversely to the axial direction the sidepieces are a distance apart from one another which is preferably bridged by the back. The sidepieces preferably project on one side of the back and/or preferably extend away from the back on one side. In particular, at their ends directed toward the back the sidepieces are connected to one another by the back. Preferably, the sidepieces each enclose an angle with the back of at least 135°. In particular, the sidepieces each enclose with the back an angle of less than 180°.

For example, the sidepieces enclose an angle of 90° or more than 90° between them. For example the sidepieces enclose with the back, in each case, an angle of 135° or more than 135°.

Each of the joint housings is, or is preferably, made by injection-molding a material that can be injection-molded, in particular a plastic, around the respective axial end of the connecting rod. As the plastic, preferably a thermoplastic plastic such as a polyamide, a polypropylene or a polyphthalamide is used. Alternatively however, a metal such as aluminum or magnesium can be used as the material that can be injection-molded.

The joint housings preferably consist of plastic. In particular the joint housings consist of a thermoplastic plastic such as a polyamide, a polypropylene or a polyphthalamide. Alternatively, the joint housings consist of a metal such as aluminum or magnesium. The inner joint component preferably consists of metal, in particular a ferrous material such as steel.

The link rod preferably consists of metal, in particular a ferrous material such as steel. Alternatively the link rod consists for example of organic sheeting.

During the injection-molding a high pressure can act upon the connecting rod, so that the rod could move out of the injection-molding die. For that reason, preferably one or at least one through-going positioning aperture is provided in the back. Thus, in the injection-molding die the connecting rod can be fitted onto a locating pin that extends through the positioning aperture so that the connecting rod is fixed in the injection-molding die.

Preferably, the connecting rod is made mirror-symmetrical with respect to a plane of symmetry extending in the axial direction. Preferably, this plane of symmetry extends perpendicularly or transversely to the back. Advantageously, the sidepieces are opposite one another in relation to the plane of symmetry. Preferably, in relation to the plane of symmetry the sidepieces are formed and/or arranged mirror-symmetrically to one another. Furthermore, relative to the plane of symmetry the back is formed mirror-symmetrically.

The link rod has a longitudinal central axis, in particular one that extends in the axial direction. Preferably the longitudinal central axis extends in the plane of symmetry. Relative to the axial direction and particularly in relation to the longitudinal central axis the joints and/or the inner joint components can be orientated in the same way. Preferably however, relative to the axial direction and particularly in relation to the longitudinal central axis the joints and/or the inner joint components are rotated relative to one another. For example, relative to the axial direction and particularly in relation to the longitudinal central axis the joints and/or the inner joint components are rotated relative to one another by an angle larger than 0° but smaller than 180°. Alternatively, relative to the axial direction and particularly in relation to the longitudinal central axis the joints and/or the inner joint components can for example be rotated relative to one another by an angle of 0° or 180°.

According to one design version each of the inner joint components is in the form of a ball pin, In particular, the joints are ball joints. Each ball pin preferably has a joint ball and is fitted therewith into its respective joint housing so that it can move. For example each ball pin, in particular by virtue of its joint ball, is fitted directly and able to move in its respective joint housing. Alternatively each ball pin, particularly with its joint ball, is fitted and able to move in its respective joint housing with a bearing shell interposed between them. The bearing shell is preferably a spherical shell, In particular, the bearing shell is made of plastic. The longitudinal central axis preferably passes through the midpoints of the joint balls.

The link rod is preferably a control arm or a pendulum support. In particular, the link rod is provided for a wheel suspension of a motor vehicle. Advantageously, by means of its inner joint components the link rod is connected to various vehicle components of a motor vehicle or of the motor vehicle. Preferably, by means of one of its inner joint components the link rod is connected to a first vehicle component of the, or of a motor vehicle. In addition, by means of another of its inner joint components the link rod is preferably connected to a second vehicle component of the motor vehicle. The vehicle components are in particular wheel suspension components. For example, the first vehicle component is a roll stabilizer, a vehicle body or a subfrarre. The second vehicle component is for example a control arm or a wheel carrier.

BRIEF DESCRIPTION OF THE DRAWINGS

Below, the invention is described with reference to a preferred embodiment, referring to the drawings which show.

DETAILED DESCRIPTION OF THE PREFERRED EMBODIMENTS

Figure 1:
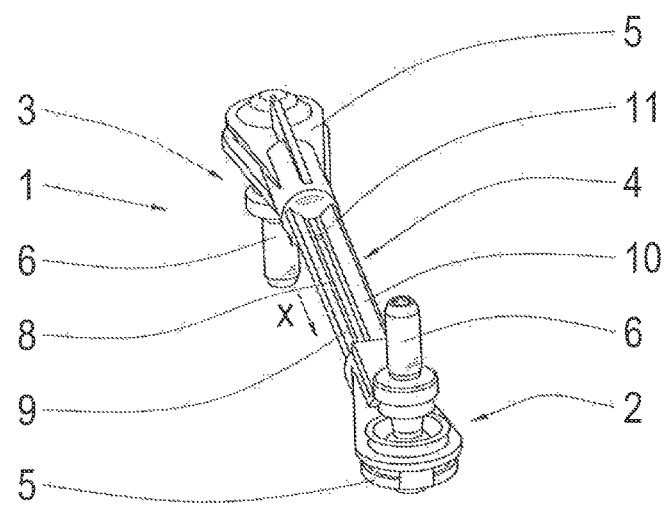
FIG. 1: A perspective view of an embodiment of a link rod.

FIG. 1 shows a perspective view of a link rod 1 according to one embodiment, wherein the link rod comprises two ball joints 2 and 3 connected to one another by a connecting rod 4 that extends in an axial direction. A side view of the link rod 1 is shown in FIG. 2 and a view of the link rod 1 seen from above is shown in FIG. 3.

The ball joints 2 and 3 each comprise a joint housing 5 made of plastic and a ball pin 6, which is fitted in an articulated manner into the respective joint housing 5 and projects outward therefrom. Furthermore, relative to a longitudinal central axis 7 of the link rod 1 that extends in the axial direction x, the ball joints 2 and 3 are rotated by 180° in relation to one another. The connection rod 4 is embedded with its axial ends each in a respective joint housing 5, and is in the form of an open section.

Figure 2:
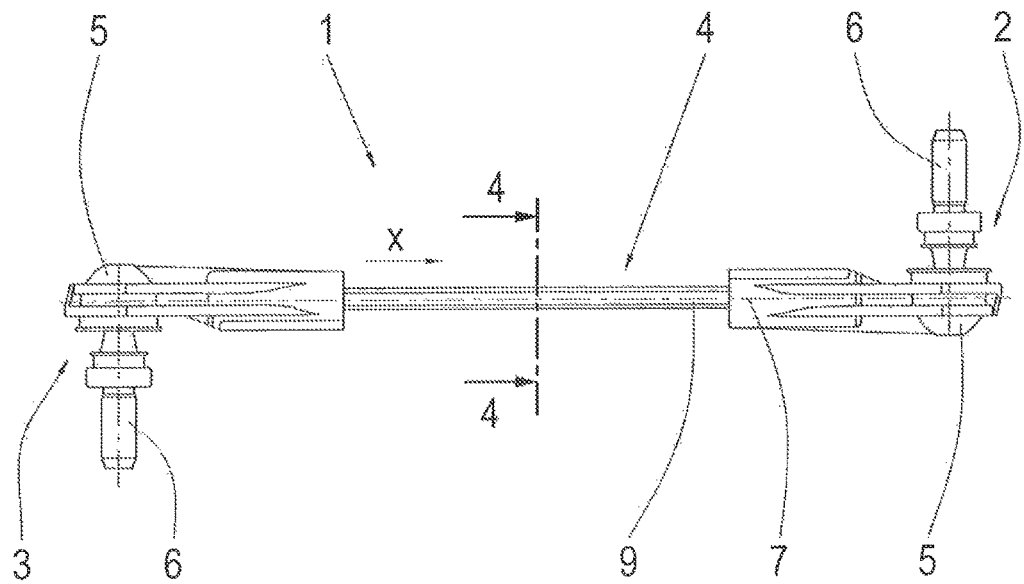
FIG. 2: A side view of the link rod.
Figure 3:
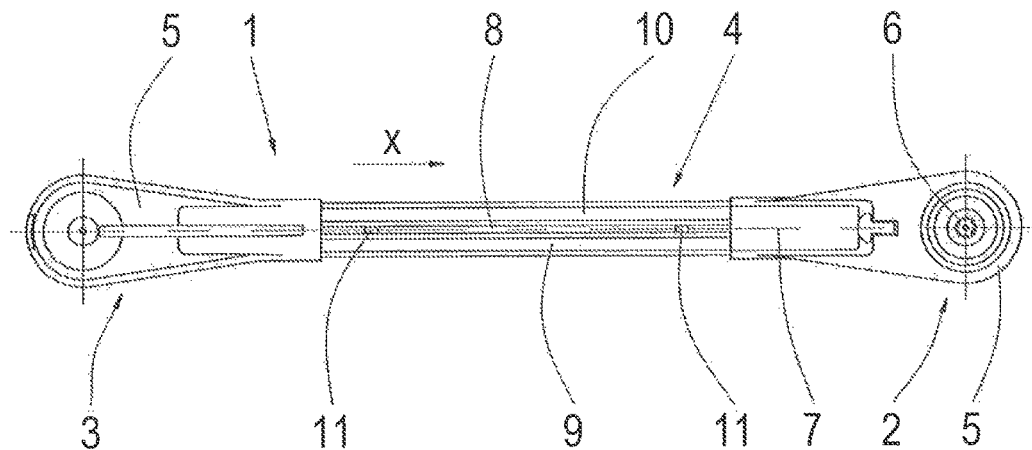
FIG. 3: A view of the link rod, as seen from above.
Figure 4:
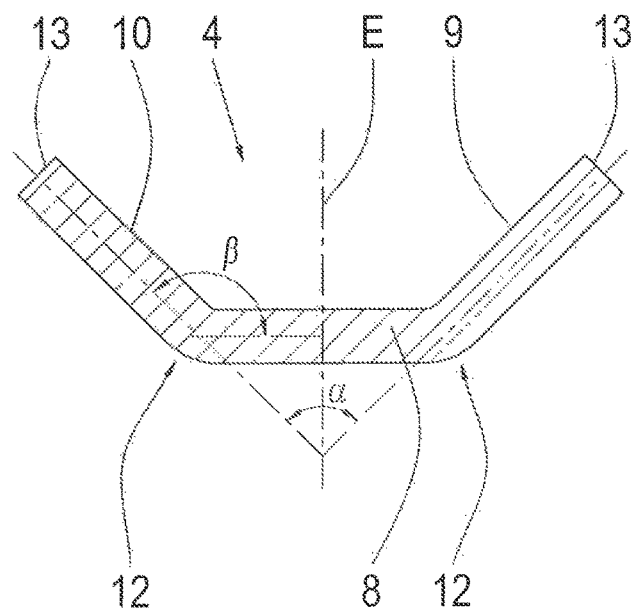
FIG. 4: A view of a connecting rod of the link rod shown in cross-section along the section line 4-4 in FIG. 2.

A sectioned view of the connecting rod 4 along the section line 4-4 in FIG. 2 is shown in FIG. 4. The connecting rod 4 has a back 8 and two sidepieces 9 and 10 opposite one another which, at their ends directed toward the back 8, are connected to one another by the back 8 and extend away from it. The ends 13 of the sidepieces 9 and 10 facing away from the back 8 form free ends of the sidepieces. In this case the two sidepieces 9 and 10 enclose between them an angle α of at least 90° but smaller than 180°. In addition, the two sidepieces 9 and 10 each enclose with the back 8 an angle β of at least 135° but smaller than 180°. The back 8 and the sidepieces 9 and 10 are substantially flat and they extend in the axial direction x. Furthermore, relative to a plane of symmetry E that runs in the axial direction x, which plane also contains the longitudinal central axis 7, the connecting rod 4 is designed mirror-symmetrically. In the back 8 two through-going positioning apertures 11 are provided, which can be seen for example in FIG. 3.

INDEXES

1 Link rod
2 Ball joint
3 Ball joint
4 Connecting rod
5 Joint housing
6 Ball pin
7 Longitudinal central axis
8 Back of the connecting rod
9 Sidepiece of the connecting rod
10 Sidepiece of the connecting rod
11 Positioning aperture
12 Sidepiece end directed toward the back
13 Sidepiece end facing away from the back
α Angle between the sidepieces
β Angle between sidepiece and the back
x Axial direction
E Plane of symmetry

The invention claimed is:

1. A link rod for a motor vehicle comprising:
a connecting rod in a form of an open profile that extends in an axial direction, and comprising a back and two opposed sidepieces which are connected to one another by the back and extending away from the back such that ends of the sidepieces facing away from the back are free ends of the sidepieces, and the two sidepieces enclosing an angle of at least 90° and less than 180° therebetween, and
two joints being connected to one another by the connecting rod,
each of the two joints comprising a joint housing and an inner joint component that is fitted and able to move in the joint housing and extending outward from the joint housing, and
the connecting rod being embedded, at respective axial ends thereof, in one of the joint housings.

2. The link rod according to claim 1, wherein the back is either flat or substantially flat.

3. The link rod according to claim 1, wherein the sidepieces are connected to the back, at ends thereof directed toward the back, and the sidepieces are spaced apart from one another by the back.

4. The link rod according to claim 1, wherein, in each case, the sidepieces form an angle of at least 135° but less than 180° with the back.

5. The link rod according to claim 1, wherein at least one through-going positioning aperture is provided in the back.

6. The link rod according to claim 1, wherein the two joints are rotated relative to one another, relative to a longitudinal central axis that extends in the axial direction.

7. The link rod according to claim 1, wherein the two joints are ball joints and each of the inner joint components is a ball pin.

8. The link rod according to claim 1, wherein the joint housing is formed by injection-molding an injection-moldable material around the respective axial end of the connecting rod.

9. The link rod according to claim 1, wherein the joint housings consist of plastic.

10. The link rod according to claim 1, wherein the connecting rod is made of metal.

11. A link rod for a motor vehicle comprising:
a connecting rod having an open profile extending in an axial direction and comprising a back and two sidepieces, the back facilitates connecting the two sidepieces to one another, and the two sidepieces extending away from the back and enclosing an angle of at least 90° less than 180° therebetween, and ends of the sidepieces facing away from the back are free ends of the sidepieces, and
two joints being connected to one another by the connecting rod,
each of the two joints comprising a joint housing and an inner joint component that is fitted and able to move in the joint housing and extending outward from the joint housing, and
the connecting rod being embedded, at respective axial ends thereof, in one of the joint housings.

12. A link rod for a motor vehicle comprising:
a connecting rod defining a longitudinal axis, the connecting rod having a planar back and first and second sidepieces that are integral with and extending from laterally opposite sides of the planar back, such that ends of the sidepieces facing away from the back are free ends of the sidepieces,
one axial end of the connecting rod being embedded within a housing of a first joint and an opposite axial end of the connecting rod being embedded within a housing of a second joint,
the housings of the first and the second joints each receiving a respective inner joint component such that the inner joint components being respectively pivotably coupled, via the first and the second joints, to the connecting rod,
the inner joint components of the first and the second joints extending outwardly from the housings of the first and the second joints, respectively, and
the first and the second sidepieces are oriented with respect to one another to enclose an angle therebetween which is at least 90° but less than 180°.

13. The link rod according to claim 12, wherein the planar back and the first and the second sidepieces are integrally connected to one another such that the connecting rod has cross section that is mirror-symmetrical relative to a plane of symmetry that contains the longitudinal axis and is perpendicular to the planar back.

* * * * *